(12) United States Patent
Oh et al.

(10) Patent No.: US 10,079,380 B2
(45) Date of Patent: Sep. 18, 2018

(54) JELLY-ROLL OF IMPROVED PRODUCTIVITY AND BATTERY CELL COMPRISING THE SAME

(71) Applicant: LG CHEM, LTD., Seoul (KR)

(72) Inventors: Jiyoung Oh, Cheongju-si (KR); Ki Gon Kim, Cheongju-si (KR); Dae Hyun Cho, Cheongwon-gun (KR); Junbo Seo, Cheongju-si (KR)

(73) Assignee: LG CHEM, LTD., Seoul (KR)

( * ) Notice: Subject to any disclaimer, the term of this patent is extended or adjusted under 35 U.S.C. 154(b) by 53 days.

(21) Appl. No.: 15/188,609

(22) Filed: Jun. 21, 2016

(65) Prior Publication Data

US 2016/0301060 A1 Oct. 13, 2016

Related U.S. Application Data

(63) Continuation of application No. 14/170,979, filed on Feb. 3, 2014, now abandoned, which is a continuation (Continued)

(30) Foreign Application Priority Data

Aug. 12, 2011 (KR) .................... 10-2011-0080477

(51) Int. Cl.
*H01M 2/26* (2006.01)
*H01M 10/0525* (2010.01)
(Continued)

(52) U.S. Cl.
CPC ............. *H01M 2/263* (2013.01); *B23K 20/10* (2013.01); *H01M 10/0431* (2013.01);
(Continued)

(58) Field of Classification Search
CPC ................... B23K 20/106; H01M 2/20–2/206
See application file for complete search history.

(56) References Cited

U.S. PATENT DOCUMENTS 6,117,589 A  9/2000 Satou et al.
6,197,074 B1  3/2001 Satou et al.
(Continued)

FOREIGN PATENT DOCUMENTS

CN  101425605 A  5/2009
CN  201498546 U  6/2010
(Continued)

OTHER PUBLICATIONS

Machine translation of JP 09306471 A, retrieved Sep. 25, 2017 (Year: 1997).*
(Continued)

*Primary Examiner* — Maria Laios
*Assistant Examiner* — Robert S Carrico
(74) *Attorney, Agent, or Firm* — Nutter McClennen & Fish LLP; John J. Penny, Jr.

(57) ABSTRACT

Disclosed herein is a jelly roll for a secondary battery configured by winding a cathode sheet, a separator, and an anode sheet, wherein electrode tabs are connected to uncoated portions of the electrode sheets, to which electrode active materials are not applied, by welding, and each of the electrode tabs is configured to have an embossed structure protruding toward the uncoated portion to improve weldability.

9 Claims, 2 Drawing Sheets

Related U.S. Application Data of application No. PCT/KR2012/006076, filed on Jul. 31, 2012.

(51) Int. Cl.
- H01M 10/04 (2006.01)
- H01M 10/0587 (2010.01)
- B23K 20/10 (2006.01)

(52) U.S. Cl.
CPC ... H01M 10/0525 (2013.01); H01M 10/0587 (2013.01); H01M 2220/30 (2013.01); Y10T 29/49108 (2015.01)

(56) References Cited

U.S. PATENT DOCUMENTS

| | | | |
|---|---|---|---|
| 2006/0040179 A1 | 2/2006 | Bang | |
| 2007/0154798 A1 | 7/2007 | Jung | |
| 2008/0182162 A1* | 7/2008 | Kim | H01M 2/204 429/99 |
| 2011/0248069 A1* | 10/2011 | Khakhalev | B23K 20/106 228/110.1 |

FOREIGN PATENT DOCUMENTS

| | | | |
|---|---|---|---|
| CN | 102104134 A | | 6/2011 |
| JP | 1-232661 A | | 9/1989 |
| JP | 1-232667 A | | 9/1989 |
| JP | 09306471 A | * | 11/1997 |
| JP | 09-330706 A | | 12/1997 |
| JP | 2000-306570 A | | 11/2000 |
| JP | 2002-260628 A | | 9/2002 |
| JP | 2005-149921 A | | 6/2005 |
| JP | 2005149921 A | * | 6/2005 |
| JP | 2010-282846 A | | 12/2010 |
| KR | 10-0670502 B1 | | 1/2007 |
| KR | 10-0709872 B1 | | 4/2007 |
| KR | 10-0889767 B1 | | 3/2009 |

OTHER PUBLICATIONS

Chinese Office Action with English translation dated Jun. 23, 2015.
International Search Report, issued in PCT/KR2012/006076, dated Feb. 18, 2013.
Japanese Office Action dated Feb. 10, 2015.
IPDL Machine Translation of JP 2005-149921 A, published Jun. 2005.
Machine English Translation of JP 2002-260628 A, dated Sep. 13, 2002.
Supplementary European Search Report dated Jun. 10, 2014 in application No. 12823813.6.
Written Opinion of the International Searching Authority dated Feb. 18, 2013 in PCT/KR2012/006076.

* cited by examiner

JELLY-ROLL OF IMPROVED PRODUCTIVITY AND BATTERY CELL COMPRISING THE SAME

CROSS-REFERENCE TO RELATED APPLICATIONS

This application is a Continuation of copending application Ser. No. 14/170,919 filed on Feb. 3, 2014, which is a Continuation application of PCT International Application No. PCT/KR2012/006076 filed on Jul. 31, 2012, which claims the benefit of Patent Application No. 10-2011-0080477 filed in the Republic of Korea on Aug. 12, 2011, all of which are hereby expressly incorporated by reference into the present application.

TECHNICAL FIELD

The present invention relates to a jelly roll exhibiting improved productivity and a battery cell including the same, and, more particularly, to a jelly roll for a secondary battery configured by winding a cathode sheet, a separator, and an anode sheet, wherein electrode tabs are connected to uncoated portions of the electrode sheets, to which electrode active materials are not applied, by welding, and each of the electrode tabs is configured to have an embossed structure protruding toward the uncoated portion to improve weldability.

BACKGROUND ART

As mobile devices have been increasingly developed, and the demand for such mobile devices has increased, the demand for secondary batteries has also sharply increased. Among such secondary batteries is a lithium secondary battery exhibiting high energy density and operating voltage and excellent preservation and service-life characteristics, which has been widely used as an energy source for various electronic products as well as mobile devices.

Based on the shape of a battery case, a secondary battery may be classified as a cylindrical battery having an electrode assembly mounted in a cylindrical metal container, a prismatic battery having an electrode assembly mounted in a prismatic metal container, or a pouch-shaped battery having an electrode assembly mounted in a pouch-shaped case formed of an aluminum laminate sheet. The cylindrical battery has advantages in that the cylindrical battery has relatively large capacity and is structurally stable.

The electrode assembly mounted in the battery case serves as a power generating element, having a cathode/separator/anode stack structure, which can be charged and discharged. The electrode assembly may be classified as a jelly roll type electrode assembly configured to have a structure in which a long sheet type cathode and a long sheet type anode, to which active materials are applied, are wound in a state in which a separator is disposed between the cathode and the anode, a stacked type electrode assembly configured to have a structure in which a plurality of cathodes having a predetermined size and a plurality of anodes having a predetermined size are sequentially stacked in a state in which separators are disposed respectively between the cathodes and the anodes, or a stacked/folded type electrode assembly, which is a combination of the a jelly roll type electrode assembly and the stacked type electrode assembly.

In this connection, the structure of a conventional cylindrical secondary battery is shown in FIG. 1.

Referring to FIG. 1, a cylindrical secondary battery 100 is manufactured by mounting a jelly roll type (wound type) electrode assembly 120 in a battery case 130, injecting an electrolyte into the battery case 130, and coupling a cap assembly 140 having an electrode terminal (for example, a cathode terminal, which is not shown) to the upper end, which is open, of the battery case 130.

The electrode assembly 120 is configured to have a structure in which a cathode sheet 121 and an anode sheet 122 are wound in a circle in a state in which a separator 123 is disposed between the cathode sheet 121 and the anode sheet 122. A cylindrical center pin 150 is fitted in the core of the electrode assembly 120 (the center of the jelly roll). The center pin 150 is generally made of a metal material to exhibit predetermined strength. The center pin 150 is configured to have a hollow cylindrical structure formed by rolling a sheet type material. The center pin 150 serves to fix and support the electrode assembly. Also, the center pin 150 serves as a passage to discharge gas generated by internal reaction of the secondary battery when charging and discharging the secondary battery and when operating the secondary battery.

An insulation member 160, which is configured to have a sheet type structure, is mounted at the upper end of the electrode assembly 120. The insulation member 160 is provided at the center thereof with an opening communicating with a through hole 151 of the center pin 150, through which gas can be discharged and through which a cathode tab 142 of the electrode assembly 120 can be connected to a cap plate 145 of the cap assembly 140.

Also, an insulation member 170 is disposed at the lower end of the cylindrical secondary battery 100. The insulation member 170 is located between the lower end of the electrode assembly 120 and the battery case 130. The insulation member 170 is provided at the center thereof with an opening, through which an anode tab (not shown) attached to the anode sheet 122 is connected to the lower end of the battery case 130.

The cathode tab and the anode tab are generally connected to uncoated portions of the cathode sheet and the anode sheet (portions of the electrode sheets, i.e. metal current collectors, to which electrode active materials are not applied) by ultrasonic welding.

Specifically, ultrasonic welding between the cathode sheet and the cathode tab is typically shown in a sectional view of FIG. 2.

Referring to FIG. 2, the cathode tab 142 is disposed on an uncoated portion 121a of the cathode sheet in contact with the uncoated portion 121a of the cathode sheet, and the cathode tab 142 is pressed by an ultrasonic welding device 300 including a plurality of horn tips 310. At this time, ultrasonic vibration is transmitted to the cathode tab 142, and the cathode tab 142 is welded to the uncoated portion 121a of the cathode sheet by frictional heat generated as the result of the ultrasonic vibration.

However, the cathode tab and the cathode sheet are flat with the result that the cathode tab may wear down when ultrasonic welding is performed in a state in which the horn tips are in contact with the cathode tab. Also, high coupling between the cathode tab and the cathode sheet is required, and therefore, electrode active materials may be separated from the cathode sheet during welding based on the application of high ultrasonic waves.

Therefore, there is a high necessity for technology to fundamentally solve the above problems.

DISCLOSURE

Technical Problem

Therefore, the present invention has been made to solve the above problems, and other technical problems that have yet to be resolved.

It is an object of the present invention to provide a jelly roll in which an embossed structure is formed at each electrode tab, preventing wear of the electrode tabs and improving weldability during ultrasonic welding.

It is another object of the present invention to provide a secondary battery using the jelly roll with improved productivity and safety.

Technical Solution

In accordance with one aspect of the present invention, the above and other objects can be accomplished by the provision of a secondary battery configured by winding a cathode sheet, a separator, and an anode sheet, wherein electrode tabs are connected to uncoated portions of the electrode sheets, to which electrode active materials are not applied, by welding, and each of the electrode tabs is configured to have an embossed structure protruding toward the uncoated portion to improve weldability.

That is, the embossed structures as described above are formed at the jelly roll according to the present invention. When comparing with the conventional structure in which welding is performed with respect to flat electrode tabs, therefore, high friction between the electrode tabs (specifically, portions having the embossed structures) and the uncoated portions of the electrode sheets is achieved although a vibration energy level is lowered during welding, thereby improving weldability between the electrode tabs and the uncoated portions.

The electrode tabs may be made of aluminum or nickel. For example, the cathode tab may be made of aluminum, and the anode tab may be made of nickel; however, the present invention is not limited thereto.

In a preferred example, the embossed structure may include a plurality of micro protrusions configured to have a structure having protruding parts formed at one side thereof facing the uncoated portion and depressed parts formed at the other side thereof so as to correspond to the protrusions.

The shape of the protruding parts and the depressed parts is not particularly restricted. Preferably, the protruding parts and the depressed parts are formed in the shape of a hemisphere.

Preferably, each of the micro protrusions has a protruding height of 50 to 500 microns. If the protruding height is too high, welding between the electrode tabs and the uncoated portions is not easily achieved, which is not preferable. On the other hand, if the protruding height is too high, it is difficult for the embossed structures to function, which is not also preferable. More preferably, each of the micro protrusions has a protruding height of 100 to 150 microns.

Meanwhile, the electrode tabs are connected to the uncoated portions, preferably, by ultrasonic welding to minimize deformation of welded portions and to achieve easy application with respect to thin uncoated portions.

Concretely, the ultrasonic welding may be performed by a welding device comprising horn tips arranged at intervals corresponding to the micro protrusions of the embossed structure.

Consequently, welding is performed by the horn tips corresponding to the micro protrusions, thereby maximizing weldability between the electrode tabs and the uncoated portions.

Also, the ultrasonic welding may be performed by applying ultrasonic waves in a state in which the horn tips are located in the depressed parts of the respective micro protrusions.

In the conventional ultrasonic welding, it is necessary for the height of each of the horn tips contacting the electrode tabs to be about 350 microns so that vibration energy generated from the horn tips can be effectively transmitted to the corresponding surfaces of the electrode sheets contacting the electrode tabs. However, the horn tips, the height of which is relatively high, may be easily damaged. In addition, the electrode tabs may be worn by the horn tips.

According to the present invention, on the other hand, the protruding parts are formed at the regions of the electrode tabs corresponding to the depressed parts of the electrode tabs, in which the horn tips are located, i.e. the regions of the electrode tabs facing the uncoated portions, and therefore, it is possible to provide high weldability simply by reducing the height of each of the horn tips. Consequently, it is possible to solve problems, such as wear of the electrode tabs.

Concretely, each of the horn tips preferably has a height of 50 to 300 microns, more preferably about 100 microns.

Meanwhile, each of the horn tips 320 may have an angle of 60 to 120 degrees. Preferably, each of the horn tips is formed in the shape of a pyramid having an angle of 90 degrees.

In accordance with another aspect of the present invention, there is provided a method of manufacturing the jelly roll. Concretely, the method of manufacturing the jelly roll includes (a) winding a cathode sheet and an anode sheet in a state in which a separator is disposed between the cathode sheet and the anode sheet, (b) positioning electrode tabs each having an embossed structure formed at a surface thereof on uncoated portions of the cathode sheet and the anode sheet so that protruding parts of the embossed structure face a corresponding one of the uncoated portions, and (c) positioning horn tips of a welding device in depressed parts of the embossed structure of each of the electrode tabs and applying ultrasonic waves to the depressed parts.

That is, ultrasonic welding is performed using the horn tips corresponding to the embossed structure, thereby minimizing wear of the electrode tabs and improving weldability between the electrode tabs and the uncoated portions.

In accordance with another aspect of the present invention, there is provided a battery cell including the jelly roll, wherein the jelly roll is mounted in a battery case.

The battery cell is a secondary battery which can be continuously charged and discharged. The battery cell may be configured in various forms, such as a prismatic battery and a cylindrical battery cell. Preferably, the battery cell is a cylindrical battery cell.

Also, the battery cell is preferably applied to a middle or large-sized battery module of high power and large capacity comprising a plurality of battery cells as unit cells by virtue of excellent weldability.

The structure of the middle or large-sized battery module and a method of manufacturing the same are well known in the art to which the present invention pertains, and a detailed description thereof will be omitted.

Advantageous Effects

As is apparent from the above description, the jelly roll according to the present invention has the embossed structures protruding toward the uncoated portions. Consequently, it is possible to minimize wear of the electrode tabs and to improve weldability, thereby improving safety of the battery cell.

BRIEF DESCRIPTION OF DRAWINGS

The above and other objects, features and other advantages of the present invention will be more clearly understood from the following detailed description taken in conjunction with the accompanying drawings, in which.

DETAILED DESCRIPTION OF THE INVENTION

Now, a preferred embodiment of the present invention will be described in detail with reference to the accompanying drawings. It should be noted, however, that the scope of the present invention is not limited by the illustrated embodiment.

Figure 3:
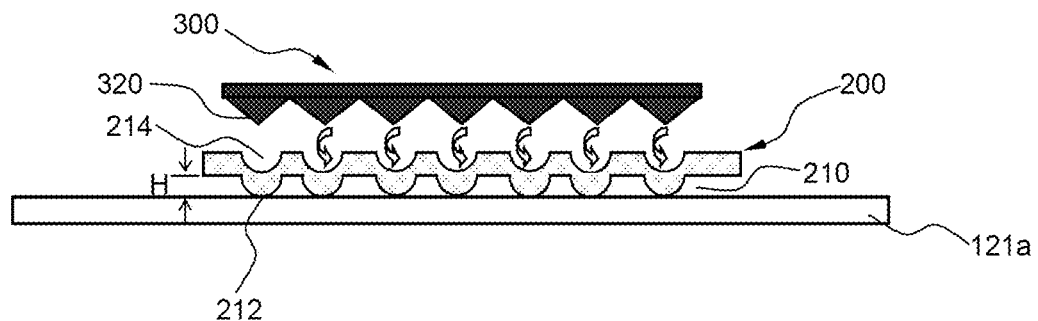
FIG. 3 is a partial sectional view showing welding between a cathode sheet and a cathode tab according to an embodiment of the present invention.
Figure 4:
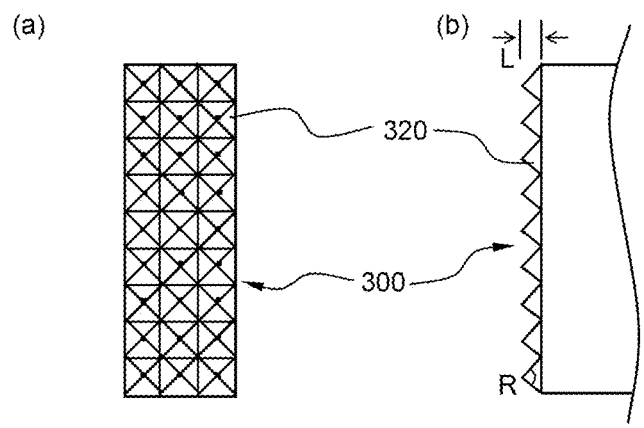
FIG. 4 is a front view showing a welding device according to the present invention with a partial side view of the welding device.
Figure 5:
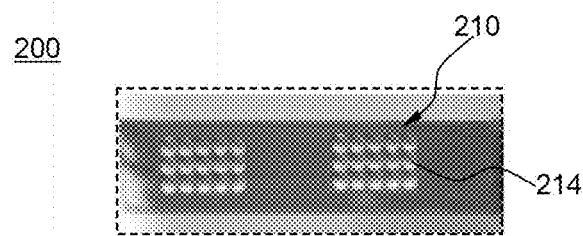
FIG. 5 is a photograph showing a portion of an electrode tab of FIG. 3.

FIG. 3 is a partial sectional view showing welding between a cathode sheet and a cathode tab according to an embodiment of the present invention, FIG. 4 is a front view showing a welding device of FIG. 3 with a partial side view of the welding device, and FIG. 5 is a photograph showing a portion of an electrode tab of FIG. 3.

Figure 1:
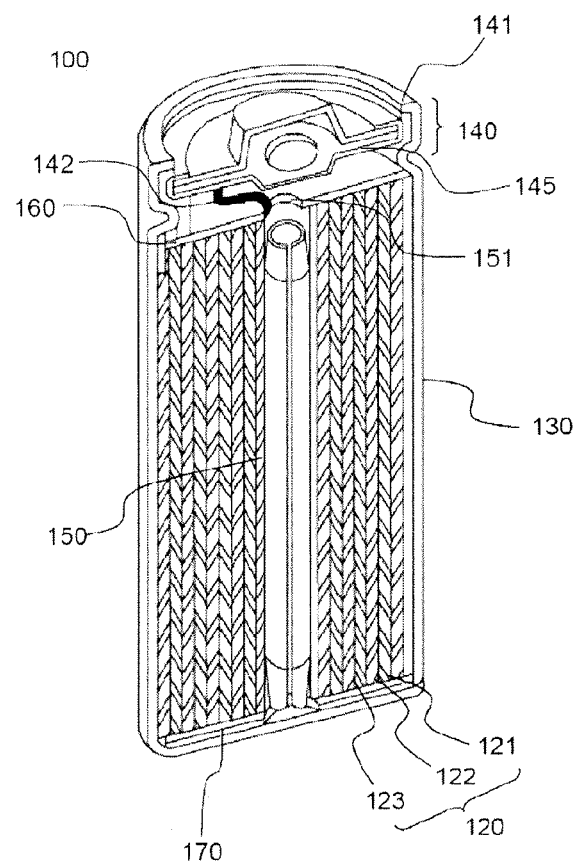
FIG. 1 is a vertical sectional perspective view showing a conventional cylindrical secondary battery.
Figure 2:
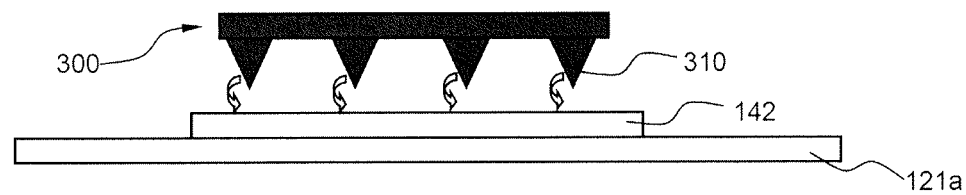
FIG. 2 is a partial sectional view showing welding between a cathode sheet and a cathode tab of FIG. 1.

Referring to these drawings together with FIG. 1, a jelly roll 120 for a secondary battery is configured by winding a cathode sheet 121, a separator 123, and an anode sheet 122. A cathode tab 200, which is made of a nickel material, is connected to an uncoated portion 121a of the cathode sheet 121, to which an electrode active material is not applied, by ultrasonic welding. The cathode tab 200 is configured to have an embossed structure which protrudes toward the uncoated portion 121a to improve weldability.

The embossed structure includes a plurality of micro protrusions 210 configured to have a structure having protruding parts 212 formed at one side thereof facing the uncoated portion 121a and depressed parts 214 formed at the other side thereof so as to correspond to the protrusions 212.

Each of the micro protrusions 210 has a protruding height H of about 120 microns.

Meanwhile, ultrasonic welding is performed by a welding device 300 including horn tips 320 arranged at intervals corresponding to the micro protrusions 210 of the embossed structure.

The welding device 300 includes horn tips 320 arranged in a 3×9 matrix. Each of the horn tips 320 has a height L of about 100 microns. Also, each of the horn tips 320 is formed in the shape of a pyramid having an angle R of 90 degrees.

Ultrasonic welding is performed by applying ultrasonic waves in a state in which the horn tips are located in the depressed parts 214 of the respective micro protrusions 210. Consequently, it is possible to minimize wear of the electrode tab even in a case in which horn tips 320, the height of each of which is low, are used.

Such ultrasonic welding may be performed with respect to an anode tab, which is made of an aluminum material, in the same manner.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

The invention claimed is:

1. A method of manufacturing a jelly roll, the method comprising:
   (a) winding a cathode sheet and an anode sheet in a state in which a separator is disposed between the cathode sheet and the anode sheet;
   (b) positioning electrode tabs each having an embossed structure formed at a surface thereof on uncoated portions of the cathode sheet and the anode sheet such that protruding parts of the embossed structure faces a corresponding one of the uncoated portions; and
   (c) positioning horn tips of a welding device in depressed parts of the embossed structure of each of the electrode tabs and applying ultrasonic waves to the depressed parts, wherein the embossed structure is formed prior to positioning the horn tips in the depressed parts.

2. The method according to claim 1, wherein the electrode tabs are made of aluminum or nickel.

3. The method according to claim 1, wherein the embossed structure comprises a plurality of micro protrusions configured to have a structure having the protruding parts formed at one side thereof facing the uncoated portion and the depressed parts formed at the other side thereof so as to correspond to the micro protrusions.

4. The method according to claim 3, wherein each of the micro protrusions has a protruding height of 50 to 500 microns.

5. The method according to claim 3, wherein each of the micro protrusions has a protruding height of 100 to 150 microns.

6. The method according to claim 1, wherein the electrode tabs are connected to the uncoated portions by ultrasonic welding.

7. The method according to claim 6, wherein the embossed structure comprises a plurality of micro protrusions, and wherein the horn tips of the welding device are arranged at intervals corresponding to the micro protrusions of the embossed structure.

8. The method according to claim 7, wherein the depressed parts correspond to the micro protrusions of the embossed structure, and wherein the ultrasonic welding is performed by applying ultrasonic waves in a state in which the horn tips are located in the depressed parts of the respective micro protrusions.

9. The method according to claim 1, wherein uncoated portions of the cathode sheet and the anode sheet are flat prior to applying ultrasonic waves to the depressed parts of the electrode tabs.

* * * * *